No. 16,085. PATENTED NOV. 18, 1856.
P. BURGESS.
MACHINERY FOR POLISHING GLASS.

UNITED STATES PATENT OFFICE.

PHINEAS BURGESS, OF NEW YORK, N. Y.

MACHINE FOR POLISHING GLASS.

Specification of Letters Patent No. 16,085, dated November 18, 1856.

*To all whom it may concern:*

Be it known that I, PHINEAS BURGESS, of the city, county, and State of New York, have invented a new and useful improvement in machinery for polishing the surfaces of glass and other materials that are capable of being polished by friction; and I do hereby declare that the following is a full, clear, and exact description of the same, reference being had to the accompanying drawings, forming part of this specification, in which—

Figure 1:
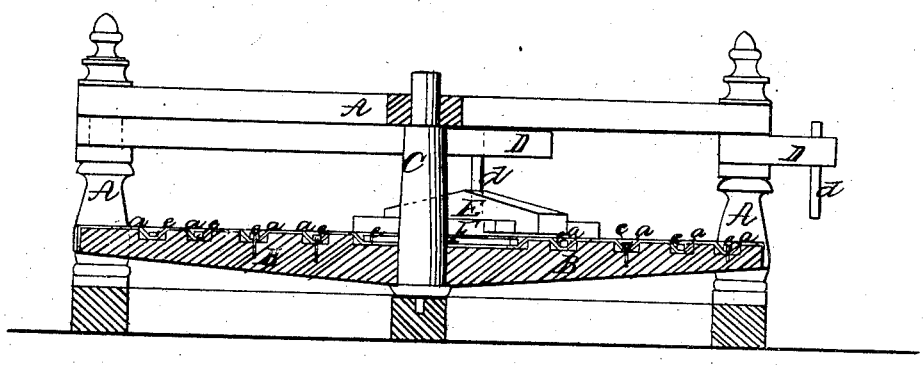
Figure 2:
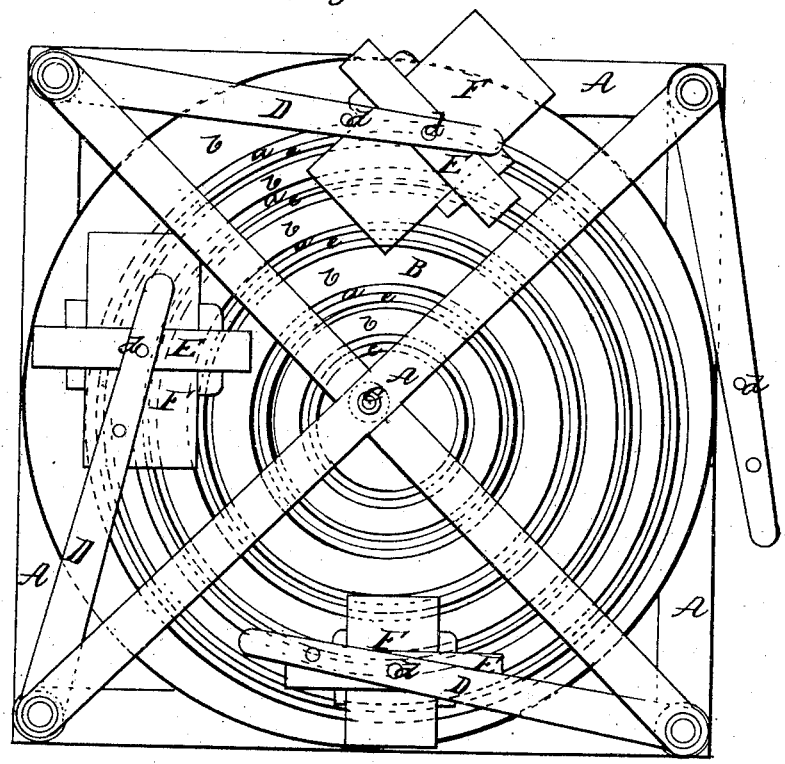

Figure 1 is a vertical section of a polishing machine for plate glass with my improvement. Fig. 2 is a plan of the same.

Similar letters of reference indicate corresponding parts in both figures.

In polishing plate glass and other materials on a polishing bed of the usual kind, that is to say, a bed having an unbroken flat surface, using a fine polishing substance in a moist state, all air is excluded from between the polishing bed and the surface being polished, and the pressure of the atmosphere on the back of the slab or other piece of material being polished produces such excessive friction as to require very great power to produce the motion necessary for polishing.

This invention relates to improvements on the patent granted to Alfred Broughton, granted November 7, 1854, and reissued Feb. 12, 1856.

The machine represented in the drawing operates on the principle laid down in the specification of Letters Patent granted to Alfred Broughton, Nov. 7th, 1854, and reissued Feb. 12th, 1856.

A, is the frame of the machine.

B, is the rotating polishing bed secured to the upright shaft C.

D, D, are the cranes which hold the pivots $d$, $d$, of the frames E, E, in which the slabs of glass F, F, are secured to be polished.

The polishing bed B, is made of iron or wood covered with felt or woolen cloth. The felt or cloth is shown tinted blue in the section Fig. 1.

$a$, $a$, are the grooves in the bed, said grooves being in the form of circles, arranged one within the other, their width and the width of the spaces $b$, $b$, between and around them being made nearly equal in order to reduce the polishing surface, consisting of the spaces $b$, $b$, to about one half the area of the bed, and their depth being sufficient to prevent their being quickly filled up with the polishing material. The circular grooves are made eccentric to the center of the bed in order to prevent any part of the surface of the glass being escaped by the polishing surface in their rotation. The cloth or felt covering of the bed is confined in the grooves by metal rings $e$, $e$, which are screwed or nailed down to the bottom of the grooves outside of it.

I am aware that polishing beds with grooves upon their surfaces have been before used. But in all such beds the grooves are arranged at right angles, or in parallel lines, or in regular circles, or rings one with the other. But this method is objectionable because certain portions of the glass will necessarily escape from being brought in contact with the polishing surfaces, and the polish will therefore be uneven and imperfect. Much time, labor and watchfulness on the part of the attendants is also required to shift the glass in order to secure even a passable polish. But by having the grooves arranged eccentrically, as in my improvement, the above difficulties are entirely overcome. Every portion of the surface of the glass is inevitably brought in contact with the polishing surface, and a sure and even polish is produced by the simple rotation of the main shaft, without any labor or attention from the attendant. By my method of arranging the grooves the polishing is also done much quicker. An important saving of time, labor and expense is thus effected.

I do not claim the grooving of the beds for polishing glass, but

I claim—

As an improvement on Alfred Broughton's patent of November 7th, 1854, and reissued Feb. 12, 1856, the employment and use of grooves arranged eccentrically upon the polishing bed, B, in combination with the cranes D, and frames E, as set forth.

PHINEAS BURGESS.

Witnesses:
 JAMES F. BUCKLEY,
 W. TUSCH.